United States Patent [19]

Kim

[11] Patent Number: 5,541,379

[45] Date of Patent: Jul. 30, 1996

[54] ROTARY DIAL FOR USE IN A VIDEO CASSETTE RECORDER

[75] Inventor: Hak-Soo Kim, Incheon, Rep. of Korea

[73] Assignee: Daewoo Electronics Co., Ltd., Seoul, Rep. of Korea

[21] Appl. No.: 375,316

[22] Filed: Jan. 18, 1995

[30]     Foreign Application Priority Data

Jan. 19, 1994 [KR] Rep. of Korea .................. 1994-853

[51] Int. Cl.⁶ ............................................. H01H 13/62
[52] U.S. Cl. ..................... 200/566; 200/565; 200/318; 200/321
[58] Field of Search .................................. 200/564, 565, 200/566, 567, 336, 321, 322, 327, 318, 323, 324, 325, 179, 11 R, 116, 11 J

[56]          References Cited

U.S. PATENT DOCUMENTS

| | | | |
|---|---|---|---|
| 3,767,880 | 10/1973 | Austin | 200/318 |
| 3,892,931 | 7/1975 | Lockard | 200/564 |
| 5,428,197 | 6/1995 | McCurry et al. | 200/302.2 |

*Primary Examiner*—David J. Walczak
*Attorney, Agent, or Firm*—Anderson Kill Olick & Oshinsky, P.C.

[57]          ABSTRACT

A video cassette recorder operable in a plurality of picture search modes comprises a rotatable knob and a locking mechanism. The knob returns to an initial position thereof when an operational force applied thereto is released. Each of the picture search modes are selected in response to a respective angular displacement of the knob from the initial position. The locking mechanism has a locking arm urged to lock the knob while the video cassette recorder operates in one of the picture search modes.

2 Claims, 2 Drawing Sheets

ROTARY DIAL FOR USE IN A VIDEO CASSETTE RECORDER

FIELD OF THE INVENTION

The present invention relates to a video cassette recorder; and, more particularly, to an improved rotary dial system of video cassette recorder for selecting various picture search modes.

DESCRIPTION OF THE PRIOR ART

As is well known, a video cassette recorder has a plurality of operation switches, e.g., a rewinding switch, a play switch, a fast forward switch, a stop switch and the like. Each of these switch button is manually operated to perform the respective function. The video cassette recorder normally performs picture search modes through the operation of the fast forward switch or the rewinding switch. In this particular instance, the various search modes having different feed speeds of a video tape may require the use of additional switches, thereby confusing or inconveniencing the user.

To overcome this problem, a rotary dial system for use in a video cassette recorder has been proposed. The rotary dial system includes a rotary switch and a knob. The rotary switch has a shaft capable of rotating in a predetermined range across a neutral position; and is structured so that an angular displacement from the neutral position of the shaft is converted into a command for controlling the picture search speed and direction, i.e., feed speed and direction of the video tape. Normally, a greater angular offset from the neutral position represents a higher picture search speed. The rotary switch may contain a self-return mechanism therein. Rotating the knob, which is fixed to the shaft, during the play mode causes one of the search modes to be performed in accordance with the angular displacement of the knob. The knob automatically returns to the neutral position through the action of the self-return mechanism when the operational force is released.

However, since the release of the force applied to the knob causes the knob to return to the neutral position, i.e., play mode, the user should hold the knob during the picture search mode.

SUMMARY OF THE INVENTION

It is, therefore, a primary object of the present invention to provide an improved rotary dial system capable of holding or preventing a knob from returning to an initial position during a picture search mode.

The above and other objects of the present invention are accomplished by providing a video cassette recorder operable in at least two picture search modes and having a rotary switch system, wherein said rotary switch system comprises:

a rotatable knob, the knob being capable of returning to an initial position thereof when an operational force applied thereto is released, one of the picture search modes being selected in response to an angular displacement of the knob from the initial position; and means for locking the knob while the video cassette recorder operates in the selected picture search mode.

BRIEF DESCRIPTION OF THE DRAWINGS

The above and other objects, advantages and features of the present invention will be apparent from the following description of preferred embodiments taken in conjunction with the accompanying drawings, wherein.

DETAILED DESCRIPTION OF THE PREFERRED EMBODIMENTS

Figure 1:
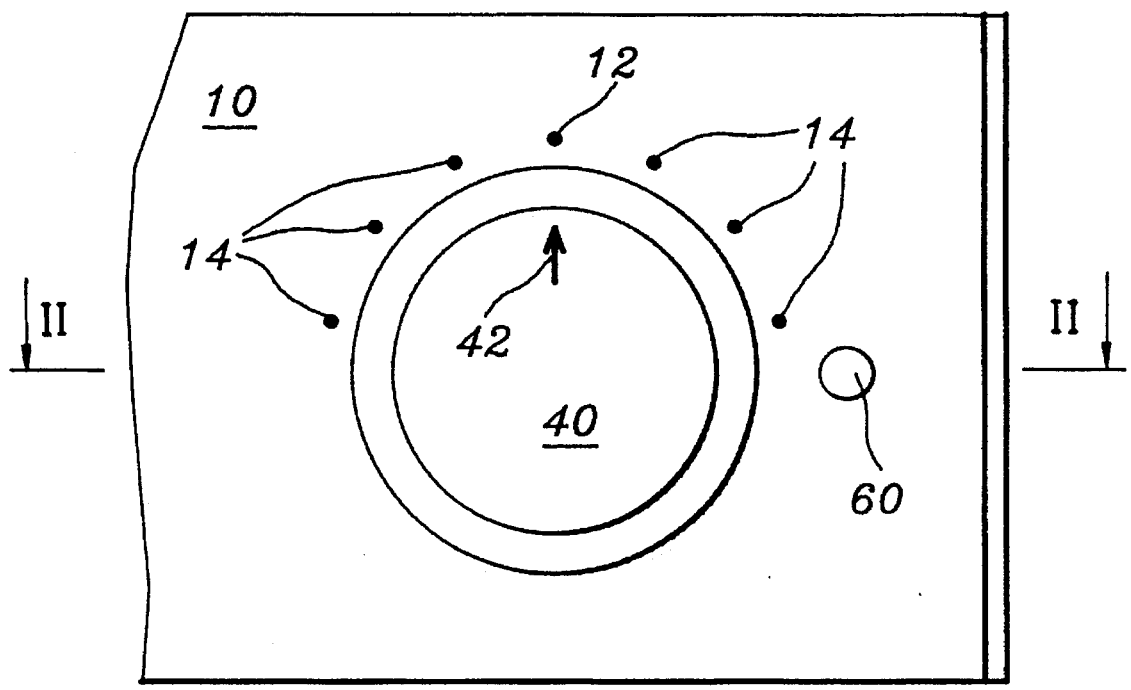
FIG. 1 provides a front view of a video cassette recorder, showing a part of a front housing thereof employing a rotary dial system in accordance with the present invention.
Figure 2:
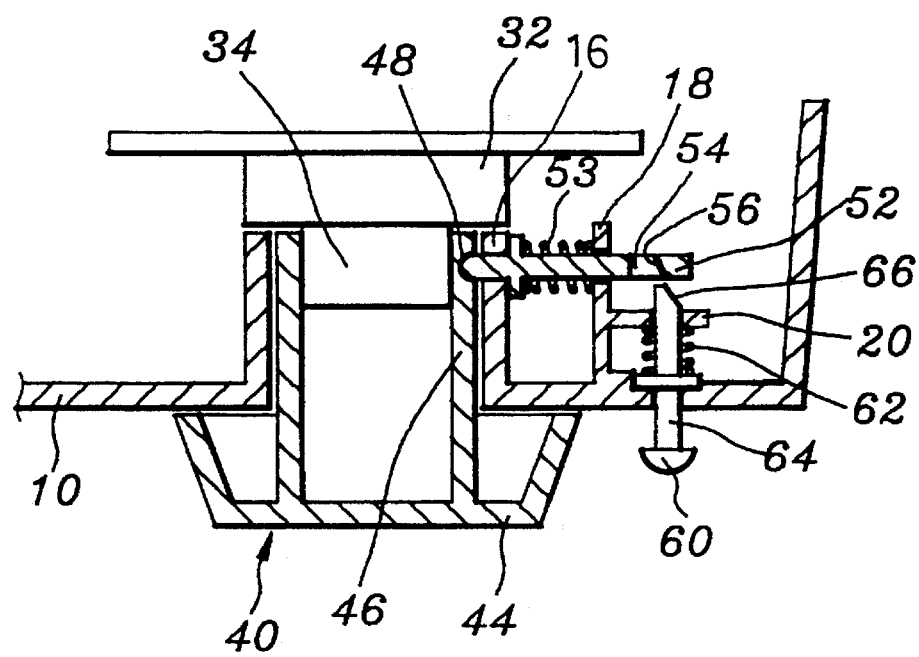
FIG. 2 is a sectional view taken along line II—II indicated in FIG. 1, setting forth a locked state of the rotary dial system.

Referring to FIGS. 1 and 2, a video cassette recorder comprises a front panel 10, a rotary dial system and a locking mechanism. The rotary dial system includes a rotary switch 32 fixed to the front panel 10, and a knob 40 coupled to a shaft 34 of the rotary switch 32.

As shown in FIG. 1, the front panel 10 has a plurality of marks including a neutral position or initial position 12 representing the play mode, and other positions 14 representing, e.g., various picture search modes. During the play mode, the knob 40 is positioned so that an arrow 42 thereof indicates the initial position 12. When the arrow 42 points to one of the picture search mode marks 14, one of the picture search modes, e.g., the review mode having two times the normal feed speed is performed. More detailed description on the relation between a position of the knob 40 and the operation of the video cassette recorder can be found in, e.g., European Patent Publication No. 0 441 556 A2, which is incorporated herein by reference.

Referring now to FIG. 2, there is illustrated a sectional view of the rotary dial system in accordance with the present invention. The shaft 34 of the rotary switch 32 is capable of rotating in a predetermined range beyond the initial position. The shaft 34 is coupled to a self-return mechanism incorporated in the rotary switch 32 to automatically return it to the initial position, when an operational force applied thereto is released. The rotary switch 32 also has a sensor system to convert an angular displacement from the initial position of the shaft 34 into an output signal for commanding a picture search mode.

The knob 40 has a body 44 of frustum. A cylindrical flange 46 extends from the body 44. The knob 40 is secured to the shaft 34 through, e.g., tight fitting between the flange 46 and the shaft 34. The knob 40 has a plurality of recesses 48 which are arranged on the periphery of the flange 46 in a circumferential direction(see FIG. 3).

The locking mechanism includes a locking arm 52 and a release button 60. The locking arm 52 is urged against the knob 40 by a spring 53. The locking arm 52 has a hole 54. A surface 56 distant to the knob 40 among the surfaces surrounding the hole 54 slopes toward the front panel 10. The locking arm 52 is supported and guided by a first bracket 16 and a second bracket 18 of the front panel 10.

The release button 60 is exerted by a spring 62 against the front panel 10. The release button 60 is held and guided by the front panel 10 and a third bracket 20 thereof. The release button 60 has a boss member 64. An end portion of the boss member 64 has an inclined surface 66 corresponding to the sloping surface 56 of the locking arm 52.

Figure 3:
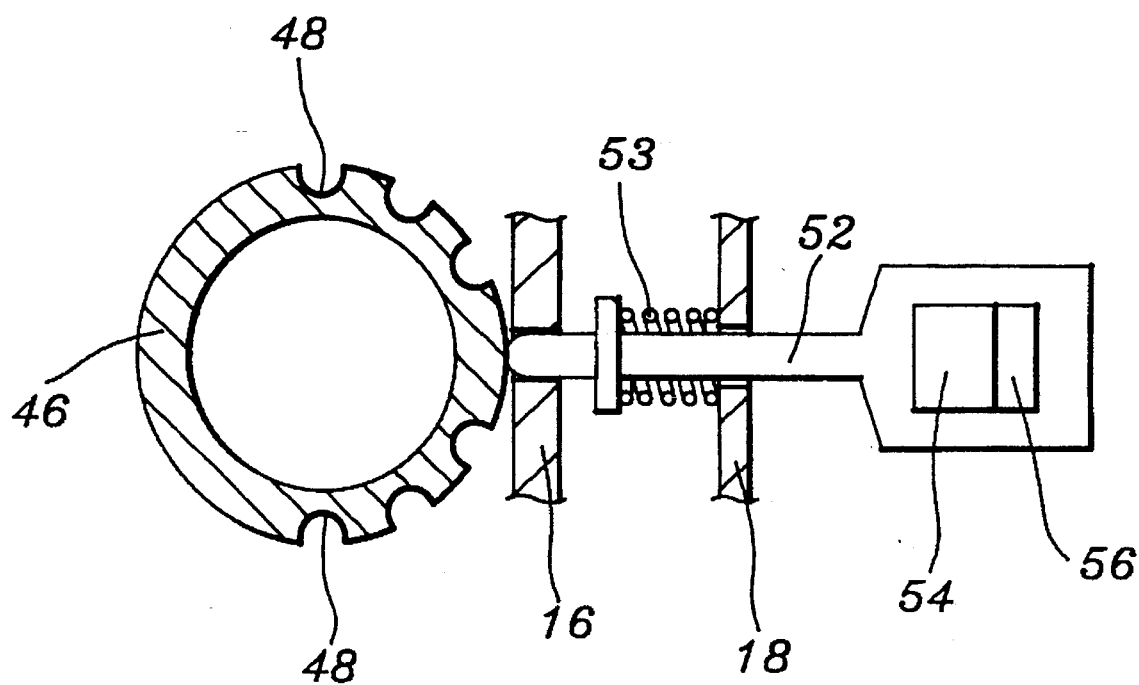
FIGS. 3 and 4 present longitudinal sectional views of the rotary dial system, depicting the operation of the knob and the locking arm depicted in FIG. 2.
Figure 4:
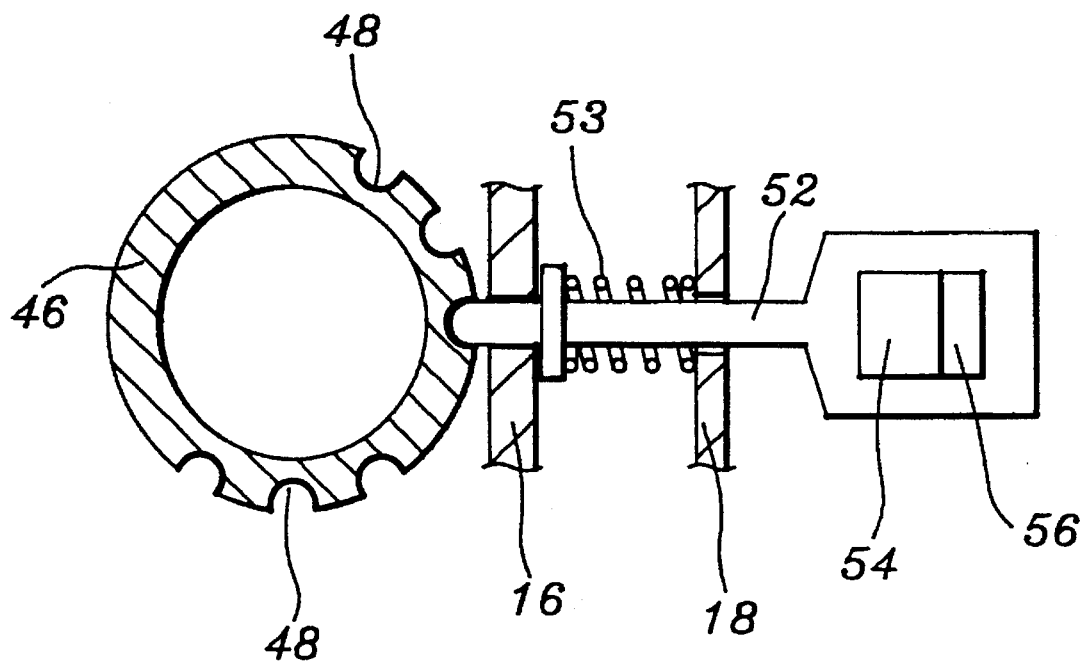

Operation of the rotary dial system and the locking mechanism will now be described with reference to FIGS. 2 to 4. During the play mode, the knob 40 is positioned at the initial position, as shown FIG. 3. Pushing the button 60 causes the locking arm 52 to move backward through a cooperation between the sloping surface 56 of the locking arm 52 and the inclined surface 66 of the button 60. While the button 60 is pressed, the knob 40 can be rotated freely. After rotating the knob 40 in a predetermined range or angle to select one of the picture search modes, releasing the button 60 causes one end of the locking arm 52 to be inserted into one of the recesses 48, as illustrated in FIGS. 2 and 4.

During a picture search mode, pushing the release button 60 allows the knob 40 to automatically come back to the initial position, i.e., the play mode, through an action of the self-return mechanism incorporated in the rotary switch 32.

Although the invention has been shown and described with respect to the exemplary embodiments, it should be understood that various changes, modifications and additions may be made without departing from the spirit and scope of the invention.

What is claimed is:

1. A video cassette recorder operable in at least two picture search modes and having a rotary switch system, wherein said rotary switch system comprises:

a rotatable knob, the knob being capable of automatically returning to an initial position thereof when an operational force applied thereto is released, one of the picture search modes being selected in response to an angular displacement of the knob from the initial position, said knob including a cylindrical boss member with a plurality of recesses arranged on a periphery of the boss member in a circumferential direction; and means for locking the knob while the video cassette recorder operates in the selected picture search mode, said locking means including a locking arm urged against the boss member of the knob, the locking arm having an end thereof capable of being inserted into one of the recesses.

2. The video cassette recorder of claim 1, wherein said locking means includes a button for causing the locking arm to release the knob.

* * * * *